United States Patent Office 3,382,174
Patented May 7, 1968

3,382,174
PROCESS FOR THE PREPARATION OF $\gamma$-FeOOH
Franz Hund, Drefeld-Bockum, Germany, assignor to Farbenfabriken Bayer Aktiengesellschaft, Leverkusen, Germany, a German corporation
No Drawing. Filed June 25, 1964, Ser. No. 378,070
Claims priority, application Germany, June 26, 1963,
F 40,076; Dec. 4, 1963, F 41,468; Jan. 9, 1964,
F 41,695
12 Claims. (Cl. 252—62.57)

ABSTRACT OF THE DISCLOSURE

Preparation of temperature resistant $\gamma$-FeOOH nuclei by carrying out the nuclear formation and precipitation of iron (II)-salt solution with solution or suspension of alkali metal or alkaline earth metal base, and/or the subsequent oxidation and nuclear growth of the resultant precipitate, in the presence of about 0.1–25 parts by weight of a water-soluble phosphorus and/or arsenic compound per 100 parts by weight of Fe present in the $\gamma$-FeOOH nuclei, optionally in the further presence of a water soluble trivalent B, Al, Ga, Cr, Mn, and/or Fe salt in an amount of about 0.25–1.75 equivalents based on the content present of the corresponding $PO_4^{-3}$ and/or $AsO_4^{-3}$ stabilizer ion, and optionally with elevated temperature dehydration of the resulting $\gamma$-FeOOH particles into brown $\gamma$-Fe$_2$O$_3$ or red $\alpha$-Fe$_2$O$_3$.

---

The present invention relates to a process for the preparation of substantially temperature-resistant $\gamma$-FeOOH. $\gamma$-FeOOH and the oxides $\gamma$-Fe$_2$O$_3$ and $\alpha$-Fe$_2$O$_3$ which can be prepared from this compound by dehydration and calcination represent valuable iron-(oxide)-pigments. Moreover, $\gamma$-FeOOH and $\gamma$-Fe$_2$O$_3$ may be used for reactions in the solid state and for catalytic and absorptive processes. $\gamma$-Fe$_2$O$_3$ is particularly useful and technically interesting on account of its ferromagnetic properties.

$\gamma$-FeOOH, which occurs in nature as the mineral lepidocrocite, has hitherto been produced commercially by modified Penniman processes (see for example U.S. Patent 1,368,748). These modified processes differ from each other mainly by the method used for the production of the material containing the nuclei for the production of the FeOOH.

In the process according to British Patent 643,303, for example, an iron (II)-chloride solution is treated at elevated temperature with alkali and maintained at this temperature until a highly fluid suspension is formed. This suspension is poured into a cold dilute iron (II)-chloride solution vigorously stirred while air is introduced at temperatures of 20 to 24° C. until $\gamma$-FeOOH is formed. Solutions of iron (II)-sulfate may also be worked up by a similar method (see British Patent 640,438).

The other known processes, for example those according to German Patent 1,061,760, U.S. Patent 3,015,628, and French Patent 1,244,896 also operate in a similar way. In these processes, the finely divided $\gamma$-FeOOH, which is usually prepared separately, is developed into larger particles of the required size in iron (II)-salt solutions in the presence of iron scrap at temperatures below 66° C., preferably at 56 to 65° C. The Fe (II)-salts because of the low basicity of the Fe (II) are hydrolized to form the free acid and iron hydroxide and thus in a diachronic direction the metallic iron goes into solution as iron (II)-ions in the acid iron (II)-salt solution having a pH of between 3 to 7, preferably of between 4 to 6.5. These ions are oxidized to trivalent ferric ions by the atmospheric oxygen blown in and enable the particles of $\gamma$-FeOOH neuclei present to continue growth by hydrolysis and at the same time supply further hydrogen ions required for further dissolution of metallic iron.

$\gamma$-FeOOH nuclei prepared by the methods hitherto known are so unstable to heat that they cannot withstand temperatures of more than 66° C. at the most during the nuclear growth process and above that they decompose either into yellow $\alpha$-FeOOH nuclei or into red $\alpha$-Fe$_2$O$_3$ nuclei. Therefore during the further growth by Penniman or nitrobenzene reduction processes (see German Patents 463,773 and 518,929) such nuclei produce quite different compounds of iron. At lower operating temperatures in the $\gamma$-FeOOH processes hitherto employed, the volume/time yield is very low; in addition the particles are often too anisometric in shape.

It is an object of the present invention to overcome the foregoing disadvantages and to provide a process for the production of substantially temperature-resistant $\gamma$-FeOOH.

It is another object of the present invention to provide such a process in which nuclear formation of $\gamma$-FeOOH is carried out in the presence of stabilizers.

It is still another object of the invention to provide such a process in which temperatures above about 66° C. may be used without adversely influencing the desired characteristics of the final $\gamma$-FeOOH product.

It is a further object of the present invention to provide such a process in which the volume/time yield is comparatively high.

It is a further object of the present invention to provide such a process in which the particles of $\gamma$-FeOOH produced possess preponderantly isometric shapes.

It is a further object of the present invention to provide such a process in which the ferromagnetic properties of the $\gamma$-FeOOH may be favorably influenced, and in which the pigment properties of the $\gamma$-Fe$_2$O$_3$ and $\alpha$-Fe$_2$O$_3$ obtainable from such $\gamma$-FeOOH may be favorably influenced as well, especially in terms of the extent of particle size growth of the $\gamma$-FeOOH nuclei used and the selection of particular stabilizers.

It is a further object of the present invention to provide such a process which is commercially advantageous and comparatively inexpensive.

It is a further object of the present invention to provide $\gamma$-FeOOH and its dehydration products $\gamma$-Fe$_2$O$_3$ and $\alpha$-Fe$_2$O$_3$ having valuable color qualities and magnetic properties and low contents of attendant water-soluble salts.

Other and further objects will become apparent from a study of the within specification and accompanying examples.

It has been found in accordance with the present invention that an efficient process for the preparation of $\gamma$-FeOOH may be provided, in which nuclear formation is carried out by precipitation of iron (II)-salt solutions with alkali metal or alkaline earth bases and then oxidation of the resulting iron (II)-hydroxide or -carbonate with oxygen, air, organic nitro compounds or other oxidizing agents, and in which nuclear growth of the $\gamma$-FeOOH formed is carried out in iron (II)-salt solutions either in the presence of metallic iron, or in such iron (II)-salt solutions with simultaneous addition of equivalent quantities of iron (II)-ions and solutions or suspensions of alkali metal or alkaline earth bases, in each case using the above-mentioned oxidizing agents, or with simultaneous addition of equivalent quantities of iron (III)-ions and solutions or suspensions of alkali metal or alkaline earth bases, whereby the above-mentioned oxidizing agents are not necessary, characterized by adding to the solutions or suspensions, used for the production of the γ-FeOOH, as stabilizers water-soluble phosphorus and/or arsenic compounds in an amount of between 0.1 to 25 g. referred to 100 g. Fe contained in the γ-FeOOH-nuclei and optionally water-soluble B (III)-, Al (III)-, Ga (III)-, Cr (III)-, Mn (III)- or FE (III)-salts in an amount of between 0.25 to 1.75 equivalents referred to $PO_4^{3-}$ or $AsO_4^{3-}$.

It is an important feature of the new process that on adding phosphorus or arsenic compounds together with the above-mentioned trivalent elements, these elements are added in the form of their water-soluble salts to the starting solution and additionally the alkaline solutions of the phosphorus or arsenic compounds, whereby the quantity of the trivalent elements added corresponds to about the stoichiometric amount necessary to form the phosphates or arsenates of these trivalent elements. The trivalent elements should not be added in the form of such phosphate or arsenate compounds which are insoluble in water.

Surprisingly, γ-FeOOH particles prepared by the instant process are very resistant to high temperatures. With these particles, an increase in the γ-FeOOH precipitates can be obtained at much higher temperatures than in the processes hitherto known. It is therefore possible to subject the γ-FeOOH nuclei formed in accordance with the present invention to a growth process by the usual method but at temperatures of 55 to 100° C., and preferably 70 to 95° C.

Accordingly, it is now possible to produce γ-FeOOH at much higher volume/time yields.

Additionally, the conversion temperatures of γ-$Fe_2O_3$ to α-$Fe_2O_3$ is shifted to high temperatures.

Besides increasing the thermostability and the nuclear growth, the addition of the thermostabilizing substances can also influence the shape of the growing γ-FeOOH particles, such that with increasing quantities of phosphate or arsenate, or a mixture of arsenate and phosphate, anisometric particles (platelets, needles, prisms) are increasingly converted into isometric particles (short prisms, cubes, spheroids). With the above-mentioned trivalent metal ions, it is also possible to influence on the one hand the ferromagnetic properties and on the other hand the pigment properties of γ-$Fe_2O_3$ and α-$Fe_2O_3$ obtainable from γ-FeOOH. Such influence obviously is very important as stronger ferromagnetic properties, and true purer pigment colors render the products in question more versatile in use.

The shape of the γ-FeOOH-nuclei depends on the process conditions. Anisometric particles are preferably obtained with lower temperatures, lower degrees of precipitation of FE (II)-salts and with lower amounts of stabilizing agents. Additionally the stabilizing agents are preferably added after the nuclei formation. Isometric particles are produced with good results at higher temperatures, with higher amounts of the stabilizing agents and by adding these substances before or during the oxidation step.

The anisometric particles have a ratio of between their length to width of between 2:1 and 20:1, preferably 5:1 and 10:1 with a length of between $0.1\mu$, preferably 0.5 to $2\mu$, The isometric particles have a diameter of 0.01 to $0.5\mu$, preferably of 0.1 to $0.3\mu$.

Preferably the new process is performed in aqueous solutions; however, it can be carried out also in organic solvents such as alcohols miscible with water or mixtures of the said solvents with water.

The phosphate and arsenate ions are added in the form of their water-soluble salts in quantities of 0.1 to 25 g. $AsO_4^{-3}$ or $PO_4^{-3}$ calculated on the basis of 100 g. iron. Any compound, e.g. salt capable of forming $AsO_4^{-3}$ or $PO_4^{-3}$ ions in the aqueous reaction medium available may be used.

In this regard, the following compounds of phosphorus and/or arsenic may be used in accordance with the present invention: Primary, secondary and tertiary alkali metal, alkaline earth, and ammonium arsenates or -phosphates, such as mono-, di- and tri-sodium, potassium lithium, etc. and ammonium phosphates, as the case may be, and mixed salts thereof, such as sodium ammonium phosphate, etc., organically substituted ammonium arsenates such as phosphates of alkyl amines having from 1 to 20 carbon atoms, e.g. methylamine, dimethylamine, triethylamine, dodecylamine, octodecylamine, phosphates of arylamines, e.g. aniline, phenylene diamine, diphenylamine, or phosphates and free arsenic acid or phosphoric acid in admixture with equivalent quantities of alkali metal or alkaline earth bases such as hydroxides. In addition to oxidic compounds of As (V) and P (V), it is also possible to use oxidic compounds of As (III) and P (III) or halogen compounds of As (III), As (V), P (III), and P (V), such as the chloro-, bromo-, iodo-, and fluorocompounds thereof, which are converted into the corresponding oxidic compounds of As (V) and P (V) under the conditions of the reaction with simultaneous addition of alkali metal or alkaline earth hydroxides and oxidizing agents. Primary arsenates and phosphates of other metals such as boron, aluminum, gallium, chromium, manganese, and iron may also be used, as far as they are water-soluble.

The elements B, Al, Ga, Cr, Mn and Fe may be added, for example, as trivalent chlorides, sulfates, nitrates or perchlorates. The trivalent metals are used in quantities of 0.25 to 1.75 equivalents calculated on the basis of the $AsO_4^{-3}$ or $PO_4^{-3}$ ions present.

To carry out the process, γ-FeOOH nuclei prepared by the usual methods may be treated with small quantities of the thermostabilizing substances before or after their preparation in aqueous suspensions and then worked up by washing, filtration and drying.

The formation of γ-FeOOH nuclei may be effected, for example, by precipitation of a solution of iron (II)-sulfate or iron (II)-chloride with aqueous sodium hydroxide, followed by oxidation in air at temperatures up to about 50° C. Furthermore, it may be effected by the process according to British Patent 643,303 in which an iron (II)-chloride solution heated to 90° C. is added, with stirring, to a concentrated sodium hydroxide solution, after which the suspension which becomes liquid again in this solution is rapidly poured into dilute iron (II)-chloride solution and oxidized to γ-FeOOH nuclei by blowing air in at temperatures of about 20 to 25° C. with vigorous stirring.

Finally, γ-FeOOH nuclei may also be obtained according to the process of U.S. Patent 3,015,627 by precipitating iron (II)-chloride from dilute aqueous solution with sodium hydroxide at about 20° C., and according to the process of German Patent 1,061,760 in which iron hydroxide is precipitated in separate stages from a dilute iron (II)-chloride solution with sodium hydroxide under oxidation by air.

γ-FeOOH particles prepared by the various methods and thermostabilized in accordance with the invention may also be subjected to the nuclear growth process at temperatures of 55 to 100° C., preferably 70 to 95° C. For example, the nuclei may be grown in the presence of metallic iron in acid iron (II)-salt solution with air oxidation, in iron (II)-chloride solution by oxidation with $NaNO_2$ or nitrobenzene, or by the addition of iron (II)- or iron (III)-ions and alkali metal- or alkaline earth-bases with oxidation in air. It is, of course, also possible to employ any other modifications of γ-FeOOH nuclear formation or growth.

Finally, it is also possible for the thermostabilizing substances not to be added to the nuclei prepared by the usual processes until the stage of nuclear growth. In this method, the thermostabilizing substances should preferably be added continuously during the whole process of nuclear growth to the nuclear suspensions after heating above 65° C.

Since nuclear formation generally proceeds better with iron (II)-chloride solution than with iron (II)-sulfate solution, it may be advantageous to carry out the nuclear formation in iron (II)-chloride solutions and the nuclear growth process in iron (II)-sulfate solutions, especially when nitrobenzene is used as oxidizing agent. γ-FeOOH which can be prepared very economically by this method has the same good properties as γ-FeOOH which is treated in the later stage in iron (II)-chloride solution.

In a preferred method of carrying out the process of the invention, an iron (II)-salt solution and a solution or suspension of alkali metal or alkaline earth bases may be run continuously into a suspension of γ-FeOOH nuclei, which may also contain metallic iron, with vigorous stirring and introduction of air, in such a way that a pH of 3 to 7 and preferably 4 to 6.5 is constantly maintained in the reaction medium. The required γ-FeOOH precipitates may be rapidly increased, especially in the nitrobenzene reduction process.

Both the γ-FeOOH nuclei obtained and the γ-FeOOH particles increased in size by the nuclear growth process may be dried at temperatures of about 105° C. after washing and filtration, and may be used, for example, as valuable pigments of great coloring power. A strongly ferromagnetic brown-red γ-Fe$_2$O$_3$ is produced from γ-FeOOH by heating above 200° C. On heating to temperatures above about 310 to 500° C., γ-Fe$_2$O$_3$ can be converted into red γ-Fe$_2$O$_3$, the conversion temperature of γ-Fe$_2$O$_3$ into α-Fe$_2$O$_3$ being shifted to higher values by reason of the phosphate or arsenate ions or other trivalent ions of B, Al, Ga, Cr, Mn, incorporated therein.

Suitable bases for precipitating the iron (II)-salts are, for example, alkali metal hydroxides and alkaline earth hydroxides and their corresponding carbonates, such as sodium hydroxide and potassium hydroxide, soda, potash, calcium hydroxide or carbonate suspensions, as well as ammonia and organic amines such as primary, secondary, tertiary or quarternary alkyl amines, having from 1 to 20 carbon atoms, such as methylamine, dimethylamine, triethylamine, dodecylamine, octodecylamine, polyamines such as e.g. ehylene diamine, cycloalkyl- or aryl-amines such as pyrrolidine, N-methyl-pyrrolidine, piperidine, propyl-piperidine, pyridine, indole, chinoline, nicotine, aniline, methylaniline, diphenylamine, triphenylamine, toluidine, xylidine, phenylene diamine, naphthyl amine, benzyl amine, oxyarylamines or oxyalkylamines such as ethanol amine, choline, aminophenols; hydroxyl amine, hydrazine and alkyl- and aryl-substituted hydrazines. Normally one of the above-mentioned bases are used in the new process. However, it is possible, too, to use mixtures thereof. It is immaterial for the formation of the γ-FeOOH-nuclei whether the iron (II)-salts are precipitated incompletely, completely or more than completely. Complete precipitation is effected if 2 mols of alkali hydroxide are added per mol of iron (II)-salts, a precipitation more than completely is obtained, if more than 2 mols of alkali hydroxide are added.

When oxidizing with air or oxygen in the nuclear formation and nuclear growth, care should be taken to ensure very intimate contact between the gas stream and the reaction mixture, e.g. by passing the gases through the reaction mixture in very fine bubbles.

γ-FeOOH particles and their dehydration products γ-Fe$_2$O$_3$ and α-Fe$_2$O$_3$ particles, which are thus obtained by a commercially advantageous and inexpensive method constitute valuable orange, true brown and red iron oxide pigments whose technical properties as pigments and other properties may be varied systematically by varying the particle size (i.e. by varying the operating time of the nuclear growth process) and by varying the trivalent ions of boron, aluminum, gallium, chromium and manganese which may be introduced with the phosphate ion; thus ferromagnetic γ-Fe$_2$O$_3$ particles whose magnetic properties may also be varied systematically may be obtained from γ-FeOOH by dehydration or by reduction over Fe$_3$O$_4$ and controlled oxidation.

Owing to their higher content of free energy (see H. Remy, Lehrbuch der Anorganischen Chemie, Bd. II, p. 266, Akademische Verlagsgesellschaft, Leipzig, 8. Auflage (1955)) compared with α-FeOOH (goethite) and α-Fe$_2$O$_3$ (haematite), γ-FeOOH (lepidocrocite) and γ-Fe$_2$O$_3$ (maghaemite) preparations may be used for catalysts or in place of or as mixtures with γ-Al$_2$O$_3$ as absorbents and in many other fields.

Both the form and size of the particles of γ-FeOOH and of the oxides that can be prepared from it may be varied by suitable choice of the operating conditions. For use of the oxides as pigments, it is particularly advantageous in accordance with the invention that substantially isometric particles can be obtained.

The corresponding oil numbers determined according to ASTM D. 281–31 were found as follows: 23–28 g. oil/100 g. pigment for γ-FeOOH, 23–26 g. oil/100 g. pigment for α-Fe$_2$O$_3$, and 25–35 g. oil/100 g. pigment for γ-Fe$_2$O$_3$. The content of water-soluble salts according to DIN 53,197 is very low; it is less than 0.10 g./100 g. pigment.

The γ-Fe$_2$O$_3$ produced according to the process of the present invention has the following favorable magnetic properties: saturation remanence Br/$\gamma$ of between 350 to 400 gauss. g$^{-1}$ ml. and coercive force iHc of between 250 to 350 oersted.

The depth of color and the hiding power of synthetic iron oxide pigments of the γ-series correspond, in the selected optimum particle sizes and shapes, with the corresponding values of the α-series and the values thereof are above those of synthetic inorganic pigments in general. Synthetic iron oxide orange (γ-FeOOH) concentrated in oily binders, in triturates with white pigments, white extenders and fillers and in dry mixtures can be most closely compared with natural ochres; its depth of color, however, is 3 to 8 times greater and the color hues thereof in oil or cement are much purer than those of natural ochres.

Brown iron oxide pigment γ-Fe$_2$O$_3$ which may easily be prepared by dehydration of γ-FeOOH at temperatures below 350° C., is so-called true brown iron oxide. In contrast to mixed brown pigments obtained from yellow iron oxide (α-FeOOH), red iron oxide (α-Fe$_2$O$_3$) and black iron oxide (Fe$_3$O$_4$) of different specific weight, true brown iron oxide pigment (γ-Fe$_2$O$_3$) consists of only one type of pigment and therefore cannot separate out into particles of different size and shape and/or of different surface wetting properties and/or of different specific weights, when used in liquid dispersion media.

The principles of the present invention are further explained and illustrated by way of the following examples:

(I) NUCLEAR FORMATION—ADDITION OF THE STABILIZERS BEFORE OR DURING NUCLEAR FORMATION

Example 1

3600 ml. of a 15.0% iron (II)-sulfate solution may be heated with a chloride or sulfate compound of the element Al in quantities corresponding to the amounts indicated in Table 1 and with an amount of a 19.0% NaOH-solution in an amount as specified in Table 1, in which NaOH-solution the phosphate or arsenate amounts have been dissolved as specified in Table 1, the mixture being stirred and diluted with water to make the volume up to 24,350 ml. With vigorous stirring and introduction of atmospheric oxygen by means of an aeration stirrer, the iron (II)-hydroxide suspension obtained is oxidized in the stated operating time to orange-yellow γ-FeOOH, the temperature rising up to 50° C., depending on the speed of oxidation. Table 1 shows also the degree of precipitation of the iron (II)-ions and the analysis of the nuclear suspension in percent FeSO$_4$ and in g./l. γ-FeOOH. In all cases, γ-FeOOH nuclei were obtained which could also be worked up, for example, by washing, filtration and drying.

TABLE 1

| Experiment No. | Additive in grams | 19% NaOH, ml. | Precipitation, Percent | Minutes operating time | FeSO₄, Percent | γ-FeOOH, g./l. |
|---|---|---|---|---|---|---|
| 1.01 | No additive | 1,425 | 95 | 9.0 | 0.08 | 13.5 |
| 1.02 | 20 g. Na₃AsO₄ | 1,425 | 95 | 8.5 | 0.09 | 12.5 |
| 1.03 | 50 g. Na₃AsO₄ | 1,425 | 95 | 9.0 | 0.08 | 13.0 |
| 1.04 | 30 g. AlAsO₄ | 1,350 | 90 | 11.0 | 0.08 | 13.0 |
| 1.05 | 20 g. AlAsO₄ plus 30 g. AlPO₄ | 1,425 | 95 | 15.0 | 0.08 | 12.7 |
| 1.06 | 20 g. AlPO₄ | 1,425 | 95 | 8.5 | 0.08 | 12.7 |
| 1.07 | 50 g. AlPO₄ | 1,425 | 95 | 11.5 | 0.08 | 12.5 |
| 1.08 | 41 g. Na₃PO₄ | 1,348 | 90 | 11.0 | 0.08 | 23.7 |

Example 2.—Nuclear formation from iron (II)-chloride solution 2700 ml. of a 16.7% iron (II)-chloride solution may be treated with the chloride compounds of the elements B (III), Al (III), Fe (III) and Cr (III) in the quantities corresponding to the quantities of the elements indicated in Table 2 and with the specified quantities, in ml., of a 19.0% NaOH solution in which the stated quantities of phosphate or arsenate and/or phosphate and arsenate ions are dissolved in the form of sodium salts. The volume is made up with water to 24,350 ml. at room temperature. With vigorous stirring and using an aeration stirrer, iron (I)-hydroxide is oxidized with atmospheric oxygen to orange-yellow γ-FeOOH in the time indicated in Table 2, the temperature rising up to 50° C., depending on the speed of oxidation. Table 2 also gives the degree of precipitation of the iron (II)-ions and the analysis of the nuclear suspension in percent FeCl₂ and in g./l. α-FeOOH. The degree of precipitation varied between 50 and 100%. γ-FeOOH nuclei which can be used directly are obtained by washing, filtration and drying or high temperature heating.

TABLE 2

| Experiment No. | Additive in grams | 19% NaOH, ml. | Precipitation, Percent | Minutes operating time | FeCL₂, Percent | γ-FeOOH, g./l. |
|---|---|---|---|---|---|---|
| 2.01 | No additive | 1,500 | 100 | 7.0 | 0.03 | 13.9 |
| 2.02 | 50 g. AlAsO₄ | 1,425 | 95 | 14.0 | 0.12 | 13.1 |
| 2.03 | 30 g. AlAsO₄ | 749 | 50 | 9.0 | 0.94 | 7.5 |
| 2.04 | 41 g. Na₃AsO₄ | 1,350 | 90 | 13.0 | 0.12 | 12.1 |
| 2.05 | 30 g. FeAsO₄ | 1,350 | 90 | 13.0 | 0.24 | 11.7 |
| 2.06 | 30 g. CrAsO₄ | 1,350 | 90 | 13.5 | 0.18 | 11.9 |
| 2.07 | 50 g. BAsO₄ | 1,350 | 90 | 14.0 | 0.03 | 12.7 |
| 2.08 | (50 g. AlAsO₄)* | 1,350 | 90 | 13.5 | 0.01 | 11.8 |
| 2.09 | (20 g. Na₃PO₄)* | 1,350 | 90 | 13.0 | 0.24 | 11.7 |
| 2.10 | 20 g. AlPO₄ | 1,425 | 95 | 14.0 | 0.12 | 17.1 |
| 2.11 | 41 g. Na₃PO₄ | 1,348 | 90 | 13.0 | 0.12 | 12.1 |
| 2.12 | 30 g. FePO₄ | 1,348 | 90 | 13.0 | 0.24 | 11.7 |
| 2.13 | 20 g. CrPO₄ | 1,348 | 90 | 13.5 | 0.18 | 11.9 |
| 2.14 | 50 g. BPO₄ | 1,348 | 90 | 14.0 | 0.03 | 12.7 |
| 2.15 | 120 g. AlPO₄* | 2,996 | 50 | 27.0 | 3.90 | 24.4 |

*Four times the concentration.

Example 3.—Nuclear formation from iron (II)-chloride solution.

4000 ml. of a 20.0% iron (II)-chloride solution are treated with a quantity of aluminum chloride and sodium arsenate corresponding to 60 g. AlAsO₄ and heated to 88° C. and the solution of 504.9 g. NaOH in 800 ml. H₂O is added rapidly. The viscous suspension is stirred and maintained at 90° C. until, after about 15 minutes, it has become highly fluid. This highly fluid suspension is poured rapidly into a cold 1.5% iron (II)-chloride solution and oxidized with access of air at 20 to 24° C. with vigorous stirring to form orange-yellow γ-FeOOH nuclear particles within about 20 minutes, the temperature rising to 40° C. The nuclear suspension contains 1.15% FeCl₂ and 21.4 g./l. γ-FeOOH.

Example 4.—Nuclear formation from iron (II)-chloride solution 4000 ml. of a 20.0% iron (II)-chloride solution, in which 116.7 g. AlCl₃·6H₂O are dissolved, are heated to 88° C. and a solution of 504.9 g. NaOH in 800 ml. H₂O and a solution of 194.0 g. Na₃PO₄·12H₂O in 1200 ml. H₂O are added simultaneously. The ingredients are kept at 90° C. with stirring until the viscous suspension has become thinly liquid which takes about 15 minutes. Then, the mixture is rapidly poured into a cold 1.5% iron (II)-chloride solution and oxidized by the introduction of air at 20 to 24° C. with vigorous stirring to orange γ-FeOOH nuclei within 20 minutes, the temperature rising to 36° C. The suspension may be used as a source of growth nucleus or it may be used directly as γ-FeOOH-, γ-Fe₂O₃- or α-Fe₂O₃-phases after washing, filtration and drying, and possibly annealing. The nuclear suspension contains 1.14% FeCl₂ and 23.7 g./l. γ-FeOOH; yield: 2.37% corresponding to 505 g. γ-FeOOH.

Example 5.—Nuclear formation from iron (II)-chloride solution 58.3 g. AlCl₃·6H₂O are dissolved in 22,081 ml. of a 2.2% iron (II)-chloride solution; 1799 ml. of a 12.0% NaOH solution are treated at 26° C. with a solution of 97.0 g. Na₃PO₄·12H₂O in 600 ml. H₂O and the mixture is added to the above-mentioned iron (II)-salt solution with stirring. By introduction of atmospheric oxygen and vigorous stirring, orange γ-FeOOH is obtained in about 19 minutes with a final temperature of 32° C. This can be used as a source of nucleus particles or worked up in the usual way and used directly or after conversion into γ-Fe₂O₃ or α-Fe₂O₃. The nuclear suspension contains 0.52% FeCl₂ and 10.6 g./l. γ-FeOOH; Yield: 1.06%=260 g. γ-FeOOH.

Example 6.—Nuclear formation from iron (II)-chloride solution 21,550 ml. of a 1.59% iron (II)-chloride solution, in which 61.1 g. AlCl₃·6H₂O are dissolved, are treated at room temperature with 1000 ml. of a 19.0% NaOH solution in which 67.7 g. Na₃PO₄·12H₂O are dissolved, and the resulting ingredients are oxidized with air for 15 minutes at 20° C., with stirring, to produce particles having an orange-yellow color (pH 6 to 6.5). Then, 500 ml. of a 19.0% NaOH solution, in which 33.9 g.

Na₃PO₄·12H₂O are dissolved, are added, and the precipitated hydroxide is again rapidly oxidized to an orange color (pH 9.5 to 10). 700 ml. of a 17.5% iron (II)-chloride solution in which 15.8 g. AlCl₃·6H₂O are dissolved are then added; the precipitate is again rapidly oxidized. The nuclear suspension then contains about 0.12% FeCl₂ and about 12.9 g./l. γ-FeOOH (Yield: 1.29% γ-FeOOH) and has a final temperature of 23° C. The resulting γ-FeOOH may either be washed, filtered and dried and used as γ-FeOOH, or annealed to γ-Fe₂O₃ or α-Fe₂O₃, or used as a nucleus source for further growth.

Example 7.—Nuclear formation from iron (II)-chloride solution 22,081 ml. of a 2.2% iron (II)-chloride solution are treated with a quantity of aluminum chloride and sodium arsenate solution corresponding to 30 g. AlAsO₄ and treated at 20° C. with 1799 ml. of a 12% NaOH solution (70% precipitation). A nucleus of orange-yellow γ-FeOOH is produced in about 24 minutes by the introduction of atmospheric oxygen, the temperature rising to 28° C. The nuclear suspension contains 0.6% FeCl₂ and 10.1 g./l. γ-FeOOH.

Example 8.—Nuclear formation from iron (II)-chloride solution 23,550 ml. of a 1.49% iron (II)-chloride solution are treated with a quantity of aluminum chloride and sodium arsenate solution corresponding to 33.32 g. AlAsO₄ at room temperature and with 1000 ml. of 19% NaOH solution and then oxidized at 20° C. in air, with stirring, for 12 minutes until the color is orange-yellow (pH=6 to 6.5); 500 ml. of 19% NaOH solution are then added and the product again oxidized until the color is brown-orange (pH>10). After the addition of 700 ml. of a 17.5% iron (II)-chloride solution with a quantity of aluminum chloride and sodium arsenate solution corresponding to 16.66 g. AlAsO₄, the suspension is again oxidized rapidly (pH=6 to 6.5; time 5 minutes). The nuclear suspension contains 0.15% FeCl₂ and approximately 12.7 g./l. γ-FeOOH.

(II) NUCLEAR FORMATION—ADDITION OF STABILIZERS AFTER NUCLEAR FORMATION

Example 9.—Nuclear formation from iron (II)-sulfate solution 3600 ml. of a 15% iron (II)-sulfate solution are treated with the number of ml. of 19.0% NaOH solution specified in Table 3, enough water to make up the volume to 24,350 ml. at room temperature, and a quantity of aluminum sulfate corresponding to the quantity of AlAsO₄ or AlPO₄ as set forth in Table 3. The iron (II)-hydroxide suspension obtained is oxidized for the stated time with atmospheric oxygen to orange-yellow γ-FeOOH, using an aeration stirrer, a porous frit or a finely porous air coil. The temperature may rise up to 50° C., depending on the starting temperature and the speed of oxidation. Table 3 indicates also the degree of precipitation of the iron (II)-ions and the analysis of the nuclear suspension in percent FeSO₄ and in g./l. γ-FeOOH. After their formation, the γ-FeOOH nuclei are rendered thermostable by an after-treatment.

TABLE 3

| Experiment No. | 19 percent NaOH, ml. | Precipitation, percent | Minutes operating time | FeSO₄ percent | γ-FeOOH, g./l. | Additive after nuclear formation, g. |
|---|---|---|---|---|---|---|
| 9.01 | 1,425 | 95 | 8.5 | 0.08 | 13.1 | No additive. |
| 9.02 | 1,425 | 95 | 13.0 | 0.10 | *23.1 | 50 g. AlAsO₄. |
| 9.03 | 1,425 | 95 | 12.0 | 0.10 | 13.1 | 30 g. Na₃AsO₄. |
| 9.04 | 1,425 | 95 | 13.0 | 0.10 | *23.1 | 50 g. AlPO₄. |

*2 starting mixtures combined, sedimented, decanted and analyzed.

Example 10.—Nuclear formation from iron (II)-chloride solution 2700 ml. of a 16.7% iron (II)-chloride solution are treated with the quantity of ml. of 19% solution (NaOH) stated in Table 4 and enough water to make up the volume to 24,350 ml. at room temperature. The iron (II)-hydroxide is oxidized within the time specified to orange-yellow γ-FeOOH with atmospheric oxygen, using an aeration stirrer, porous frit or finely porous air coil while stirring vigorously. The temperature may rise up to 50° C., depending on the starting temperature and the speed of oxidation. The degree of precipitation varied from 90 to 110%. Arsenate and phosphate ions in quantities corresponding to the quantities of compounds given in Table 4 and in some cases also cations of trivalent metals (B, Al, Ga, Cr, Fe, Mn) as noted are added to the nuclear suspensions which are then again briefly stirred.

TABLE 4

| Experiment No. | 19 percent NaOH, ml. | Precipitation, percent | Minutes operating time | FeCl₂ percent | γ-FeOOH, g./l. | Additive after nuclear formation, g. |
|---|---|---|---|---|---|---|
| 10.01 | 1,500 | 100 | 7.0 | 0.03 | 13.9 | No additive. |
| 10.02 | 1,350 | 90 | 22.0 | 0.20 | 11.0 | 30 g. AlAsO₄. |
| 10.03 | 1,350 | 90 | 23.0 | 0.22 | 11.6 | 50 g. Na₂AsO₄. |
| 10.04 | 1,350 | 90 | 22.0 | 0.20 | 11.8 | 20 g. Na₃AsO₄ plus 30 g. Na₃PO₄. |
| 10.05 | 2,700 | 90 | 70.0 | 0.50 | 21.4 | 60 g. AlAsO₄. |
| 10.06 | 1,350 | 90 | 24.0 | 0.24 | 11.0 | 50 g. FeAsO₄. |
| 10.07 | 1,350 | 90 | 22.5 | 0.12 | 11.9 | 50 g. BAsO₄. |
| 10.08 | 1,350 | 90 | 22.5 | 0.12 | 11.9 | 40 g. BAsO₄ plus 30 g. BPO₄. |
| 10.09 | 1,350 | 90 | 25.0 | 0.12 | 11.5 | 30 g. MnAsO₄. |
| 10.10 | 1,350 | 90 | 20.0 | 0.10 | 10.9 | 40 g. CrAsO₄. |
| 10.11 | 1,348 | 90 | 23.0 | 0.22 | 11.6 | 30 g. AlPO₄. |
| 10.12 | 1,348 | 90 | 23.0 | 0.25 | 11.6 | 50 g. Na₃PO₄. |
| 10.13 | 1,650 | 110 | 15.0 | 0.03 | 13.0 | 50 g. AlPO₄. |
| 10.14 | 1,350 | 90 | 24.0 | 0.25 | 11.7 | 20 g. FePO₄. |
| 10.15 | 1,350 | 90 | 23.0 | 0.10 | 11.9 | 50 g. BPO₄. |
| 10.16 | 1,350 | 90 | 22.0 | 0.15 | 11.9 | 20 g. MnPO₄. |
| 10.17 | 1,350 | 90 | 22.5 | 0.10 | 11.7 | 30 g. GaPO₄. |

Example 11.—Nuclear formation from iron (II)-chloride solution 4000 ml. of a 20.0% iron (II)-chloride suspension are heated to 88° C. and a solution of 504.9 g. NaOH in 800 ml. H₂O is added rapidly and the viscous suspension maintained at about 90° C. with stirring until, after about 15 minutes, it has become highly fluid. This highly fluid suspension is poured rapidly into a cold 1.5% iron (II)-chloride solution and oxidized, in about 20 minutes with air at 20 to 24° C. and vigorous stirring, to orange-yellow γ-FeOOH nuclei, the temperature rising up to 40° C. The nuclear suspension containing 1.15% FeCl₂ and 21.4 g./l. γ-FeOOH is treated, with stirring, with a quantity of aluminum chloride and sodium arsenate solution corresponding to 60 g. AlAsO₄ and then briefly stirred.

Example 12.—Nuclear formation from iron (II)-chloride solution 22,081 ml. of a 2.2% iron (II)-chloride solution are treated at 20° C. with 1799 ml. 12% NaOH solution (70% precipitation). A nuclear suspension of orange-yellow γ-FeOOH is produced in about 24 minutes by introducing atmospheric oxygen, the temperature rising to about 28° C. The nuclear suspension contains 0.6% $FeCl_2$ and 10.1 g./l. γ-FeOOH. After its preparation the suspension is treated with a solution of 40.79 g. $AlCl_3.6H_2O$ (22.6% $Al_2O_3$) in 600 ml. of $H_2O$ and further with a solution of 31.49 g. $H_3AsO_4$ (66.0% $As_2O_5$) and of 21.7 g. NaOH (100% in 600 ml. of $H_2O$, the suspension such that 30 g. $AlAsO_4$ is present for the whole nuclear quantity and the suspension is then briefly stirred.

Example 13.—Nuclear formation from iron (II)-chloride solution 23,550 ml. of a 1.49% iron (II)-chloride solution are treated at room temperature with 1000 ml. of 19.0% NaOH solution and oxidized at 20° C. with air, while simultaneously stirring, to produce an orange-yellow hue in 12 minutes (pH=6–6.5). An additional 500 ml. of 19.0% NaOH solution are then added and the precipitated hydroxide again rapidly oxidized to a brown-orange hue (pH>10). After the introduction of an additional 700 ml. of a 17.5% iron (II)-chloride solution, the suspension is again rapidly oxidized (pH=6 to 6.5; time 5 minutes). The nuclear suspension contains 0.15% $FeCl_2$ and about 12.7 g./l. γ-FeOOH. By the end of this time, the temperature had risen to 24° C. A solution of 15.05 g. $AlCl_3.6H_2O$ (21.6% $Al_2O_3$) in 400 ml. $H_2O$ and a solution of 93.52 g. $Na_3PO_4.12H_2O$ (18.67% $P_2O_5$) in 400 ml. of $H_2O$ are added simultaneously with stirring to the nuclear suspension (approximately 30 g. $AlPO_4$ for the amount of nuclear substance originally present) and then briefly stirred.

(III) NUCLEAR GROWTH

Example 14.—Nuclear growth in iron (II)-sulfate solution in the presence of iron.

Table 5 shows the experimental data for the nuclear growth in iron (II)-sulfate solutions. Next to the experiment number and nuclear number, the term "nuclear number" refers to the foregoing Examples 1–13 (nuclear formation), appears the adjusted nuclear quantity in g./l. γ-FeOOH, the percent of $FeSO_4$, the operating temperature, the operating time in hours, the final yield in g./l. γ-FeOOH and the $\alpha$-$Fe_2O_3$ or γ-FeOOH phase present according to X-ray and magnetic determinations. In stainless steel containers immersed in moderately heated water baths, the reaction mixture, final volume 6000 ml., containing 0.9% $FeSO_4$ and a quantity of γ-FeOOH nuclei as stated in Table 5, was brought into intimate contact with 500 g. iron scrap by stirring, finely divided air bubbles being passed in, and the ingredients maintained at the given temperature for the stated time. The nuclear quantity varied between 7 and 16 g./l. γ-FeOOH, the operating temperature between 50 and 90° C. and the operating time between 65 and 96 hours. The time required to reach a certain particle size, as determined by a certain color tone of the γ-FeOOH, varied according to the degree of precipitation of the nuclei, the nuclear quantity and speed of revolutions during nuclear growth, and the quantity of iron and air provided. With the exception of experiment 14.01, which was carried out with a γ-FeOOH nucleus without any stabilizer addition and experiment 14.06 in which the amount of the stabilizers was too low, all the other experiments produced yellow-orange to red-orange γ-FeOOH, depending on the particle size.

TABLE 5

| Experiment No. | Nuclear No. | γ-FeOOH, g./l. | $FeSO_4$, percent | ° C. | Operating time in hours | Yield (g./l.) γ-FeOOH | Phase |
|---|---|---|---|---|---|---|---|
| 14.01 | 1.01 | 12 | 0.9 | 80 | 96 | 65.0 | $\alpha$-$Fe_2O_3$. |
| 14.02 | 1.02 | 10 | 0.9 | 80 | 96 | 53.2 | γ-FeOOH. |
| 14.03 | 1.03 | 12 | 0.9 | 90 | 96 | 85.8 | γ-FeOOH. |
| 14.04 | 1.04 | 16 | 0.9 | 80 | 96 | 85.1 | γ-FeOOH. |
| 14.05 | 1.05 | 12 | 0.9 | 80 | 96 | 75.4 | γ-FeOOH. |
| 14.06 | 6.01 | 7 | 0.9 | 80 | 96 | 65.2 | $\alpha$-$Fe_2O_3$. |
| 14.07 | 6.02 | 16 | 0.9 | 80 | 65 (96) | 56.0 (94.0) | γ-FeOOH ($\alpha$-$Fe_2O_3$). |
| 14.08 | 6.03 | 14 | 0.9 | 80 | 65 | 50.0 | γ-FeOOH. |
| 14.09 | 1.06 | 10 | 0.9 | 50 | 96 | 54.2 | γ-FeOOH. |
| 14.10 | 1.06 | 10 | 0.9 | 65 | 96 | 81.6 | γ-FeOOH. |
| 14.11 | 1.06 | 16 | 0.9 | 80 | 96 | 102.5 | γ-FeOOH. |
| 14.12 | 1.07 | 12 | 0.9 | 80 | 96 | 105.8 | γ-FeOOH. |

Example 15.—Nuclear growth in iron (II)-chloride solution and in the presence of iron Table 6 gives the particulars for nuclear growth in iron (II)-chloride solutions. Next to the experiment numbers and nuclear numbers are given the nuclear quantities in g./l. γ-FeOOH, the percent $FeCl_2$, the reaction temperature, the operating time in hours, the yield in g./l. γ-FeOOH and the phase (red $\alpha$-$Fe_2O_3$ or orange γ-FeOOH) as determined by X-ray and magnetic tests. In stainless steel containers immersed in moderately heated water baths, the reaction mixture, having a final volume of 6000 ml., was brought into intimate contact with 500 g. iron scrap with stirring while passing in finely divided air, and the ingredients were maintained at the specified temperatures for the stated time periods.

The nuclear number varied between 3 and 10 g./l. γ-FeOOH, the operating temperature between 80 and 90° C. and the operating time between 65 and 124 hours. The time required for reaching a certain particle size, as determined by the color tone, varied according to the degree of precipitation of the nuclei, the nuclear quantity and speed of revolution during nuclear growth, as well as the quantity of iron and air provided. With the exception of experiments 15.01 in which γ-FeOOH nuclei were formed without additives and 15.10 in which experiment the γ-FeOOH nuclei were stabilized by an insufficient amount of stabilizing agent, yellow-orange to red-orange γ-FeOOH was obtained in all other cases.

TABLE 6

| Experiment No. | Nuclear No. | γ-FeOOH, g./l. | FeCl₂, Percent | °C. | Operating time in hours | Yield (g./l.) γ-FeOOH | Phase |
|---|---|---|---|---|---|---|---|
| 15.01 | 2.01 | 10.0 | 0.72 | 80 | 96 | 48.0 | α-Fe₂O₃. |
| 15.02 | 2.02 | 6 | 0.72 | 80 | 96 | 35.0 | γ-FeOOH. |
| 15.03 | 2.03 | 7 | 0.72 | 80 | 96 | 45.5 | γ-FeOOH. |
| 15.04 | 2.04 | 6 | 0.72 | 80 | 96 | 68.5 | γ-FeOOH. |
| 15.05 | 2.05 | 7 | 0.72 | 80 | 96 | 42.5 | γ-FeOOH. |
| 15.06 | 2.06 | 6 | 0.72 | 80 | 96 | 55.6 | γ-FeOOH. |
| 15.07 | 2.07 | 5 | 0.72 | 80 | 96 | 66.5 | γ-FeOOH. |
| 15.08 | 2.08 | 7 | 0.72 | 80 | 96 | 62.4 | γ-FeOOH. |
| 15.09 | 2.09 | 6 | 0.72 | 80 | 96 | 63.8 | γ-FeOOH. |
| 15.10 | 7.01 | 10 | 0.72 | 80 | 96 | 54.0 | α-Fe₂O₃. |
| 15.11 | 7.02 | 6 | 0.72 | 80 | 96 | 74.1 | γ-FeOOH. |
| 15.12 | 7.03 | 7 | 0.72 | 80 | 96 | 59.4 | γ-FeOOH. |
| 15.13 | 7.04 | 6 | 0.72 | 80 | 96 | 49.5 | γ-FeOOH. |
| 15.14 | 7.05 | 7 | 0.72 | 80 | 96 | 72.4 | γ-FeOOH. |
| 15.15 | 7.06 | 6 | 0.72 | 90 | 96 | 76.0 | γ-FeOOH. |
| 15.16 | 7.07 | 7 | 0.72 | 80 | 96 | 66.4 | γ-FeOOH. |
| 15.17 | 7.08 | 7 | 0.72 | 80 | 96 | 39.5 | γ-FeOOH. |
| 15.18 | 7.09 | 6 | 0.72 | 80 | 96 | 62.5 | γ-FeOOH. |
| 15.19 | 7.10 | 7 | 0.72 | 85 | 80 | 76.0 | γ-FeOOH. |
| 15.20 | 7.11 | 6 | 0.72 | 80 | 96 | 69.5 | γ-FeOOH. |
| 15.21 | 7.12 | 7 | 0.72 | 85 | 80 | 72.0 | γ-FeOOH. |
| 15.22 | 7.13 | 6 | 0.72 | 80 | 96 | 59.4 | γ-FeOOH. |
| 15.23 | 3 | 7 | 0.72 | 80 | 96 | 86.4 | γ-FeOOH. |
| 15.24 | 4 | 3 | 0.72 | 85 | 96 | 81.5 | γ-FeOOH. |
| 15.25 | 5 | 7 | 0.72 | 80 | 96 | 92.5 | γ-FeOOH. |
| 15.26 | 8 | 7 | 0.72 | 80 | 96 | 38.5 | γ-FeOOH. |
| 15.27 | 9 | 4 | 0.72 | 80 | 96 | 70.0 | γ-FeOOH. |
| 15.28 | 2.10 | 10 | 0.72 | 80 | 65 | 45.0 | γ-FeOOH. |
| 15.29 | 2.10 | 7 | 1.0 | 80 | 96 | 98.3 | γ-FeOOH. |
| 15.30 | 2.11 | 7 | 0.74 | 80 | 124 | 93.0 | γ-FeOOH. |
| 15.31 | 2.13 | 7 | 0.72 | 80 | 96 | 98.0 | γ-FeOOH. |

Example 16.—Nuclear growth in iron (II)-chloride solution by oxidation with sodium nitrite without the presence of metallic iron.

At 80° C., solutions of 900 g. FeCl₂.4H₂O in 2000 ml. H₂O and of 1250 g. hexamethylene tetramine in 2500 ml. H₂O and of 314 g. NaNO₂ in 1000 ml. H₂O are added simultaneously, by dripping constantly, in aliquot portions, into 1134 ml. of a γ-FeOOH nucleus prepared by experiment 2.03 (Table 2), and also separately into a similar γ-FeOOH ml. quantity prepared by experiment 10.11 (Table 4), in each case starting from iron (II)-chloride solution in the presence of AlAsO₄ or AlPO₄ as the case may be, the reaction mixture being stirred during the addition and then kept for another 30 minutes at 80° C. After washing, filtration and drying at 140° C., a pure orange γ-FeOOH is obtained in each instance which after dehydration at 300° C. changes into ferromagnetic true brown γ-Fe₂O₃ and after heating above 500° C. into red α-Fe₂O₃.

Example 17.—Nuclear growth in acid iron (II)-salt solution by oxidation with nitrobenzene in the presence of metallic iron at 90° C.

4000 ml. nuclei obtained by each of the following: experiment 1.05 (Table 1) from iron (II)-sulfate solution; experiment 9.02 (Table 3) from iron (II)-sulfate solution; experiment 2.04 (Table 2, Example 2) from iron (II)-chloride solution; and by experiment 10.04 (Table 4), from iron (II)-chloride solution; are respectively treated with 15 g. iron filings, 200 ml. nitrobenzene and 82.3 g. FeSO₄·7H₂O or 58.9 g. FeCl₂.4H₂O and heated to 90° C. A further 325 ml. nitrobenzene and 550 g. iron filings are added in the course of 8 hours in each of the tests. After separating off the unreacted iron and the aniline produced by reduction of the nitro compound, and after washing, filtration and drying below 150° C., orange γ-FeOOH is obtained which changes by dehydration above 180° C. into true brown, ferromagnetic γ-Fe₂O₃ and by heating at still higher temperatures—above 500° C.—into red α-Fe₂O₃.

Example 18.—Nuclear growth by addition of iron (II)-ions and alkali- or alkaline-earth bases A γ-FeOOH nuclear material corresponding to 10 g./l. and prepared respectively by experiment 2.02 (Table 2), and by experiment 10.04 (Table 4), is treated in each case with 605 ml. of a 16.7% FeCl₂ solution and heated to 80° C. in an electrically heated stainless steel container equipped with an air inlet tube and stirrer, and then air is introduced at the rate of 500 litres/hour. 3500 ml. of a 20.55% FeCl₂ solution and 3500 ml. of a 12.96% NaOH solution are added dropwise at constant rate from two separate dropping funnels in the course of 48 hours, the pH ranging between 4 to 4.5 during the whole time of the experiment. About 18,000 ml. of an orange-red γ-FeOOH suspension containing 46.5 g./l. γ-FeOOH are obtained. The pigment is washed and filtered in the usual way. Orange-red γ-FeOOH is obtained after drying at 140° C., strongly ferromagnetic, true brown γ-Fe₂O₃ after drying at 300° C. and luminous red α-Fe₂O₃ after heating above about 450° C.

Example 19.—Nuclear growth in iron (II-chloride solution by oxidation with sodium nitrite Solutions of 900 g. FeCl₂·4H₂O in 2000 ml. H₂O, 1250 g. hexamethylene tetramine in 2500 ml. H₂O and 314 g. NaNO₂ in 1000 ml. H₂O are continuously added dropwise simultaneously, in aliquot portions, in the course of 8 hours at 80° C. into 1134 ml. of a γ-FeOOH nucleus prepared according to experiment 2.15 (Table 2) from iron (II)-chloride solution in the presence of AlPO₄. The solution is continuously stirred throughout, and after the solutions have been added, the reaction mixture is kept for another 30 minutes at 80° C. After washing, filtration and drying at 140° C., a full orange γ-FeOOH is obtained which is converted after dehydration at 300° C. into true brown ferromagnetic γ-Fe₂O₃ and after annealing above 500° C. into red α-Fe₂O₃.

Example 20.—Nuclear growth in acid iron (II)-salt solution by oxidation with nitrobenzene in the presence of iron at 90° C.

2000 ml. nuclei prepared respectively according to experiment 1.06 from iron (II)-sulfate solution (Table 1), and according to experiemnt 2.15 from iron (II)-chloride solution (Table 2), are treated in each case with 50 g. iron filings, 200 ml. nitrobenzene and 82.3 g. FeSO₄·7H₂O or 58.9 g. FeCl₂·4H₂O as the case may be and heated to 90° C. A further 325 ml. nitrobenzene and 550 g. iron filings are added in each instance in the course of 8 hours. After separating off the unreacted iron and the aniline produced by reduction of the nitro compound, and after washing, filtration and drying below 150° C., orange γ-FeOOH is obtained which is converted by dehydration above 180° C. into true brown ferromagnetic γ-Fe₂O₃ and by annealing at a temperature of between 400 to 600° C. into red α-Fe₂O₃.

Example 21.—Nuclear growth by addition of iron (III)-ions and alkali- or alkaline-earth bases without the addition of any oxidation agents 14,736 ml. of a γ-FeOOH nucleus containing 11.7 g./l. γ-FeOOH and 0.24% $FeCl_2$, prepared by experiment 2.09 (Table 2), are heated to 80° C., with stirring, in an electrically heated stainless steel container, and 4500 ml. of a 27.3% $FeCl_3$ solution and 4500 ml. of a 20.16% NaOH solution are added dropwise at constant rate from two dropping funnels in 48 hours. Approximately 24,000 ml. of an orange-red suspension containing 40.2 g./l. γ-FeOOH are obtained. The pigment is washed and filtered in the usual way and after drying at 140° C. it is orange in color, after heating at 300° C. it is strongly ferromagnetic, true brown γ-$Fe_2O_3$ and after heating above 450° C. it is luminous red in color (α-$Fe_2O_3$).

Example 22.—Nuclear growth in iron (II)-chloride solution by $NaNO_2$

Solutions of 900 g. $FeCl_2 \cdot 4H_2O$ in 200 ml. $H_2O$, 1250 g. hexamethylene tetramine in 2500 ml. $H_2O$ and 314 g. $NaNO_2$ in 1000 ml. $H_2O$ are simultaneously added dropwise at proportionate rates, each at a steady rate, with stirring, in the course of 8 hours and at 80° C. to 1134 ml. of a nuclear material prepared in double concentration from iron (II)-chloride solution according to experiment 10.11 (Table 4). The nuclear material had been previously treated, after its preparation, with a concentrated $AlCl_3$ solution and $Na_3PO_4$ solution (corresponding to 60 g. $AlPO_4$). After washing, filtering and drying at 140° C., an orange γ-FeOOH is obtained which after dehydration at 300° C. changes into ferromagnetic, true brown γ-$Fe_2O_3$ and after heating above 500° C. to red α-$Fe_2O_3$.

Example 23.—Nuclear growth in acid iron (II)-chloride solution by nitrobenzene (90° C.)

The nucleus suspension of experiment 10.12 (Table 4) with 90% precipitation, without addition of sodium orthophosphate, after previous concentration by sedimenting and decanting and containing 92.5 g. γ-FeOOH (corresponding to 4300 ml. nuclear solution) and in which additionally 58.9 g. $FeCl_2.4H_2O$ are dissolved, is heated to 90° C. and maintained at that temperature with stirring for one hour; 51.5 g. $Na_3PO_4.12H_2O$ are then added, or alternatively, this quantity, dissolved in 1 litre $H_2O$ is steadily added dropwise in the course of 8 hours. In the course of the next 6 hours, 525 ml. nitrobenzene and 600 g. iron filings are added. After separating off the unreacted iron and the aniline produced by reduction of the nitro compound and after washing, filtering and drying below 150° C., orange γ-FeOOH is obtained which is converted by dehydration above 180° C. into true brown, ferromagnetic γ-$Fe_2O_3$ and by heating at temperatures of between 35 and 75° C. is converted to red α-$Fe_2O_3$.

2400 ml. of the γ-FeOOH nucleus produced by experiment 10.13 (Table 4), treated with 60 g. $AlPO_4$ (from concentrated $AlCl_3$ and $Na_3PO_4$ solutions) after nuclear formation, are heated to 90° C. in stainless steel containers with 50 g. iron nail shavings, 200 ml. nitrobenzene and 58.86 g. $FeCl_2.4H_2O$, and maintained at that temperature for ½ hour. In the course of 8 hours, another 325 ml. nitrobenzene and 500 g. iron nail shavings are added in the same portions. After separating off the unreacted iron and after distillation of the aniline formed, the orange-red γ-FeOOH pigment sludge is worked up in the same manner as in (a).

Example 24.—Oxidation in air by addition of iron (II)-ions and alkali- or alkaline-earth bases 11,052 ml. of a γ-FeOOH nucleus solution prepared by experiment 10.11 (Table 4) and containing 11.4 g./l. γ-FeOOH and 0.25% $FeCl_2$ are treated with 605 ml. of a 16.7% $FeCl_2$ solution and heated to 80° C. in an electrically heated stainless steel container equipped with an air inlet tube and stirrer, and air is introduced at the rate of 500 litres per hour. In the course of 48 hours, 3500 ml. of a 20.55% $FeCl_2$ solution and 3500 ml. of a 12.96% NaOH solution are added from two separate dropping funnels with a constant delivery rate, the pH during the whole experiment being kept between 4 and 4.5. Approximately 18,000 ml. of an orange-red γ-FeOOH suspension with 35.1 g./l. γ-FeOOH is obtained. The pigment is washed and filtered in the usual way. After drying at 140° C., orange-red γ-FeOOH is obtained, after drying at 300° C., strongly ferromagnetic, true brown γ-$Fe_2O_3$ is obtained, and after further heating above about 450° C., luminous red α-$Fe_2O_3$ is obtained.

Example 25.—Nuclear growth by addition of iron (III)-ions and alkali- or alkaline-earth bases 14,736 ml. of a γ-FeOOH nucleus prepared according to experiment 10.11 (Table 4) and containing 11.4 g./l. γ-FeOOH and 0.25% $FeCl_2$, are heated to 80° C., with stirring, in an electrically heated stainless steel container and 4500 ml. of a 27.3% $FeCl_3$ solution and 4500 ml. of a 20.16% NaOH solution are added dropwise, from two separate dropping funnels with a constant delivery rate, in the course of 48 hours. Approximately 24,000 ml. of an orange-red suspension with 36.3 g./l. γ-FeOOH is obtained. The pigment is washed and filtered as usual, and after drying at 140° C., it is orange in color, after heating to 300° C. it is strongly ferromagnetic and true brown (γ-$Fe_2O_3$), and after heating above 450° C. it is of a luminous red color (α-$Fe_2O_3$).

Each of the foregoing examples is repeated using potassium hydroxide, sodium carbonate, potassium carbonate, calcium hydroxide or the corresponding calcium carbonate-, bicarbonate compounds, ammonia, and hexamethylene tetramine, as the case may be, in place of the base previously used in each of the above examples; oxygen, air, nitrobenzene, sodium nitrite, potassium nitrite, etc. in place of the oxidizing agent previously used in the foregoing examples, as the case may be; and water soluble salts of trivalent boron, aluminum, gallium, chromium, manganese, and iron, and mixtures of such trivalent salts, such as the trivalent chlorides, and sulfates, in place of the trivalent salts previously used in each of the foregoing examples, and similar results are obtained.

Accordingly, the present invention represents an improvement in the process for the preparation of γ-FeOOH nuclei. Normally, such nuclei are formed by precipitation of iron (II)-salt solution with a member selected from the group consisting of alkali metal base solution, alkali metal base suspension, alkaline earth base solution, and alkaline earth base suspension, and oxidation of the resulting precipitate, whereas the instant improvement for obtaining temperature resistant or thermally stable γ-FeOOH comprises carrying out the preparation of such nuclei in the presence of stabilizers including a member selected from the group consisting of water-soluble phosphorus compounds, water-soluble arsenic compounds, and mixtures thereof, in an amount between about 0.1–25 parts by weight per 100 parts by weight of Fe present and a member selected from the group consisting of water-soluble Ga (III)-salts, water-soluble Al (III)-salts, water-soluble Ga (III)-salts, water-soluble Cr (III)-salts, water-soluble Mn (III)-salts, water-soluble Fe (III)-salts, and mixtures of such trivalent salts, in an amount between about 0.25–1.75 equivalents based upon the content present of the corresponding ion selected from the group consisting of $PO_4^{-3}$, $AsO_4^{-3}$, and mixtures thereof. The stabilizers are preferably introduced before the precipitation step or after the precipitation step but before the oxidation has been completed, although the stabilizers may also be introduced after the oxidation has been completed. The oxidizing agent may be selected from the group consisting of oxygen, air, organic nitro compound, and nitrite.

Furthermore, the present invention represents an improvement in the process for the preparation of γ-FeOOH particles from the corresponding nuclei. Normally, in the process for the preparation of γ-FeOOH particles, such particles are formed by nuclear growth with oxidation of γ-FeOOH nuclei in a mixture selected from the group consisting of iron (II)-salt solution and metallic iron; iron (II)-salt solution and equivalent quantities of iron (II)-ions and a member selected from the group consisting of alkali metal base solution, alkali metal base suspension, alkaline earth base solution, and alkaline earth base suspension; and iron (II)-salt solution and equivalent quantities of iron (III)-ions and a member selected from the group consisting of alkali metal base solution, alkali metal base suspension, alkaline earth base solution, and alkaline earth base suspension; whereas in accordance with the improvement for obtaining temperature resistant or thermally stable γ-FeOOH, the preparation is carried out in the presence of stabilizers of the same type as may be used in the case of stabilizing the γ-FeOOH in its nuclear form rather than in the growth embodiment. Where the stabilizers are added in the growth embodiment, they may be introduced either before or during the nuclear growth and the same type of oxidizing agents are contemplated. The nuclear growth is carried out preferably at a temperature between about 55–100° C. or preferably 70–95° C., in contrast with a temperature between about room temperature and 90° C. or more particularly 20–50° C. in the case of nuclear formation rather than nuclear growth. The pH during the nuclear growth should be between about 3–7, and more particularly 4–6.5.

In its broad aspects, therefore, the stabilizers of the invention may be added in the process for the preparation of γ-FeOOH particles in an aqueous system, either during the nuclear formation or during the nuclear growth, the formation and growth being carried out separately or successively in the same system as desired. In accordance with one particularly embodiment, the stabilizers are introduced during the nuclear growth after heating the reaction mixture to a temperature above 65° C., preferably with vigorous stirring, and in accordance with another particular embodiment of the invention, the nuclear formation is carried out in iron (II)-chloride solution while the nuclear growth is carried out in iron (II)-sulfate solution.

Advantageously, the γ-FeOOH particles obtained upon nuclear growth may be converted by dehydration at a temperature between about 180–310° C. into brown, ferromagnetic γ-Fe$_2$O$_3$, and upon further heating at a temperature between about 450–500° C., the particles are converted into red α-Fe$_2$O$_3$.

Depending upon the stabilizer ingredients utilized the γ-FeOOH, γ-Fe$_2$O$_3$, and α-Fe$_2$O$_3$, may contain 0.05–25% by weight arsenate based on the iron content and 0.25–1.75 equivalents of a member selected from the group consisting of B, Al, Ga, Cr, Mn, Fe, and mixtures thereof, based on the content of AsO$_4$$^{-3}$ ions present, or may contain 0.025–12.5% by weight arsenate and 0.025–12.5% phosphate based on the iron content, and 0.25–1.75 equivalents of a member selected from the group consisting of B, Al, Ga, Cr, Mn, Fe, and mixtures thereof based on the content of AsO$_4$$^{-3}$ and PO$_4$$^{-3}$ ions present, in each case the particles being thermally stable.

It will be appreciated by the artisan that the instant specification and examples are set forth by way of illustration and not limitation, and that various changes and modifications may be made without departing from the spirit and scope of the present invention, which is to be limited only by the scope of the appended claims.

What is claimed is:

1. In the process for the preparation of γ-FeOOH nuclei by nuclear formation and precipitation of iron (II)-salt solution with a member selected from the group consisting of alkali metal base solution, alkali metal base suspension, alkaline earth base solution, and alkaline earth base suspension, and oxidation and nuclear growth of the resultant precipitate, the improvement for obtaining temperature resistant γ-FeOOH which consists essentially of carrying out the preparation in the presence of a stabilizer selected from the group consisting of water-soluble phosphorus compounds, water-soluble arsenic compounds and mixtures thereof, in an amount between about 0.1–25 parts by weight per 100 parts by weight of Fe present in the γ-FeOOH-nuclei using a temperature for the nuclear formation between about 0–55° C. and a temperature for the nuclear growth between about 55–100° C.

2. Improvement according to claim 1, which comprises carrying out the preparation in the presence of an additional stabilizer selected from the group consisting of water-soluble B (III)-salts, water-soluble Al (III)-salts, water-soluble Ga (III)-salts, water-soluble Cr (III)-salts, water-soluble Mn (III)-salts, water-soluble Fe (III)-salts, and mixtures of such trivalent salts, in an amount between about 0.25–1.75 equivalents based upon the content present of the corresponding stabilizer ion selected from the group consisting of PO$_4$$^{-3}$, AsO$_4$$^{-3}$, and mixtures thereof.

3. Improvement according to claim 2 wherein the stabilizer is introduced before the precipitation step.

4. Improvement according to claim 2 wherein the stabilizer is introduced after the precipitation step and before the oxidation has been completed.

5. Improvement according to claim 2 wherein the stabilizer is introduced after the oxidation has been completed.

6. Improvement according to claim 2 wherein said iron (II)-salt solution is in the form of an aqueous system comprising a mixture selected from the group consisting of iron (II)-salt solution and metallic iron; iron (II)-salt solution and equivalent quantities of iron (II)-ions and a member selected from the group consisting of alkali metal base solution, alkali metal base suspension, alkaline earth base solution, and alkaline earth base suspension; and iron (II)-salt solution and equivalent quantities of iron (III)-ions and a member selected from the group consisting of alkali metal base solution, alkali metal base suspension, alkaline earth base solution, and alkaline earth base suspension.

7. Improvement according to claim 2 wherein said water-soluble phosphorus and arsenic compounds are in the form of the corresponding salt selected from the group consisting of primary, secondary and tertiary alkali metal, alkaline earth and ammonium salts.

8. Improvement according to claim 2 wherein the nuclear formation is carried out at a temperature between about 15 to 45° C. and the nuclear growth is carried out at a temperature between about 65–95° C.

9. Improvement according to claim 2 wherein the nuclear growth is carried out at a pH between about 3–7.

10. Improvement according to claim 2 wherein the pH of the reaction mixture is maintained between about 4–6.5.

11. Improvement according to claim 1 wherein the γ-FeOOH particles obtained are converted by dehydration at elevated temperature above about 200° C. and below about 310° C. into brown γ-Fe$_2$O$_3$.

12. Improvement according to claim 11 wherein the γ-Fe$_2$O$_3$ is further converted by high temperature heating between about 310–500° C. into red α-Fe$_2$O$_3$.

References Cited

UNITED STATES PATENTS

| | | | |
|---|---|---|---|
| 3,047,505 | 7/1962 | Miller | 252—62.5 |
| 3,075,919 | 1/1963 | Gruber et al. | 252—62.5 |
| 3,272,595 | 9/1966 | Maho | 252—62.5 |

TOBIAS E. LEVOW, *Primary Examiner.*

HELEN M. McCARTHY, ROBERT D. EDMONDS,
*Examiners.*

UNITED STATES PATENT OFFICE
CERTIFICATE OF CORRECTION

Patent No. 3,382,174 May 7, 1968

Franz Hund

It is certified that error appears in the above identified patent and that said Letters Patent are hereby corrected as shown below:

Column 7, line 25, "(I)-hydroxide" should read -- (II)-hydroxide --. Columns 9 and 10, TABLE 4, seventh column, line 3 thereof, "50 g. $Na_2AsO_4$" should read -- 50 g. $Na_3AsO_4$ --. Column 14, line 40, "iron (II-chloride" should read -- iron (II)-chloride --. Column 16, line 60, "Ga (III)-salts" should read -- B (III)-salts --.

Signed and sealed this 18th day of November 1969.

(SEAL)
Attest:

EDWARD M. FLETCHER, JR.  
Attesting Officer

WILLIAM E. SCHUYLER, JR.  
Commissioner of Patents